United States Patent [19]

Toyomura

[11] Patent Number: 5,454,065
[45] Date of Patent: Sep. 26, 1995

[54] ELECTRONIC APPARATUS HAVING PRINTER

[75] Inventor: Shigeru Toyomura, Yokohama, Japan

[73] Assignee: Canon Kabushiki Kaisha, Tokyo, Japan

[21] Appl. No.: 998,613

[22] Filed: Dec. 30, 1992

[30] Foreign Application Priority Data

Jan. 7, 1992 [JP] Japan .................................. 4-018477
Jun. 8, 1992 [JP] Japan .................................. 4-173906

[51] Int. Cl.$^6$ ................................................ G06K 15/00
[52] U.S. Cl. ........................... 395/105; 395/101; 400/61; 400/62
[58] Field of Search ....................... 395/101, 105, 395/109, 115, 116; 364/400, 710.13; 400/61, 62, 76

[56] References Cited

U.S. PATENT DOCUMENTS 3,761,880  9/1973  Kritz et al. ........................ 400/124.04
3,854,124 12/1974  Comstock et al. ................. 364/700
3,990,559 11/1976  Martin et al. ...................... 395/105 X
4,763,292  8/1988  Kotani et al. ..................... 364/710.13
5,077,680 12/1991  Sturm et al. ....................... 395/105

Primary Examiner—Raymond J. Bayerl
Assistant Examiner—Tracy M. Legree
Attorney, Agent, or Firm—Fitzpatrick, Cella, Harper & Scinto

[57] ABSTRACT

An electronic apparatus having a printer which can print at a speed according to a key operating speed of the user. A keyboard section KB includes: numeric keys for the user to input numeric data; function keys such as four-arithmetical operating keys such as addition "+", subtraction "−", multiplication "×", division "÷". and total "="; and function keys such as clear key "C", memory key "M+", and the like which are set so as not to perform the printing, where the printing speed of the printer PR is variable. In an arithmetic computation unit AC, a period of time which is required after the numeric key of the keyboard KB was first operated until the function key accompanied with the printing operation is operated is divided by the number of key operation times, obtaining the average value of the key operation time intervals. The printing speed of the printer PR is controlled in accordance with the average operation time interval. The number of key codes stored in a key buffer memory is judged and a driving frequency of a stepping motor is controlled, allowing the printing operation to be executed at a variable printing speed.

5 Claims, 7 Drawing Sheets

ELECTRONIC APPARATUS HAVING PRINTER

BACKGROUND OF THE INVENTION

1. Field of the Invention

The invention relates to an electronic apparatus having a printer such as an electronic desk computer.

2. Related Background Art

As an example of a conventional electronic apparatus having a printer, an electronic desk computer (hereinafter, referred to as an electronic computer) will now be described. The electronic computer has a printer of a predetermined printing speed according to the kind of apparatus. The printer is constructed so as to print in accordance with the key operation, particularly, the operation of a function key such as addition "+", subtraction "−", multiplication "×", division "÷", sign of equality "=", and the like. For instance, a special office-use electronic computer which is used in banks, companies, offices, or the like has a printer of a relatively high printing speed such as 3.8 l/sec. (lines per second) or 5 l/sec. On the other hand, a popular electronic computer has a printer of a relatively slow printing speed such as 2 l/sec, 2.5 l/sec, or 3 l/sec. Therefore, the user who requires a high speed print processing as in the bank office fields generally purchases the electronic computer having the high speed printer of a printing speed of, for instance 5 l/sec. A general user who does not need such a high speed print processing ordinarily buys the electronic computer having a low speed printer of a printing speed of, for example, 2 l/sec.

However, since the above conventional electronic computer with the printer has a printer whose printing speed differs with every apparatus, there are the following problems.

Generally, there is a proportional relation between the printing speed of the printer and the noise which is generated upon printing. As the printing speed rises, the noise which is generated upon printing increases.

There is also similarly a proportional relation between the printing speed and the electric power consumption. As the printing speed rises, the electric power consumption increases.

Therefore, in the case where the printer whose printing speed differs with every apparatus as mentioned above is installed to the electronic apparatus and the printing speed is fixed to a predetermined value, so long as the special office-use electronic computer which is used in banks, companies, offices, or the like is used, the electronic computer always prints at a high speed even when the user slowly operates the keys. Consequently, there are problems such that the noise which is generated upon printing is large and the electric power consumption also increases. On the contrary, in case of the popular electronic computer, there is a problem such that when the user becomes familiar with the key operations and the key operating speed rises, the low speed printer cannot trace the high speed key operations of the user.

SUMMARY OF THE INVENTION

It is the first object of the invention to provide a construction such that a printing speed of a printer is controlled in accordance with a key operation time interval of a keyboard and the printer can print at a speed according to the key operating speed of the user.

The second object of the invention is to 20 provide a construction such that an amount of key code information stored in key input buffer means is detected and a printing speed of a printer is controlled in accordance with the detected key code information amount.

DETAILED DESCRIPTION OF THE PREFERRED EMBODIMENTS

Figure 1:
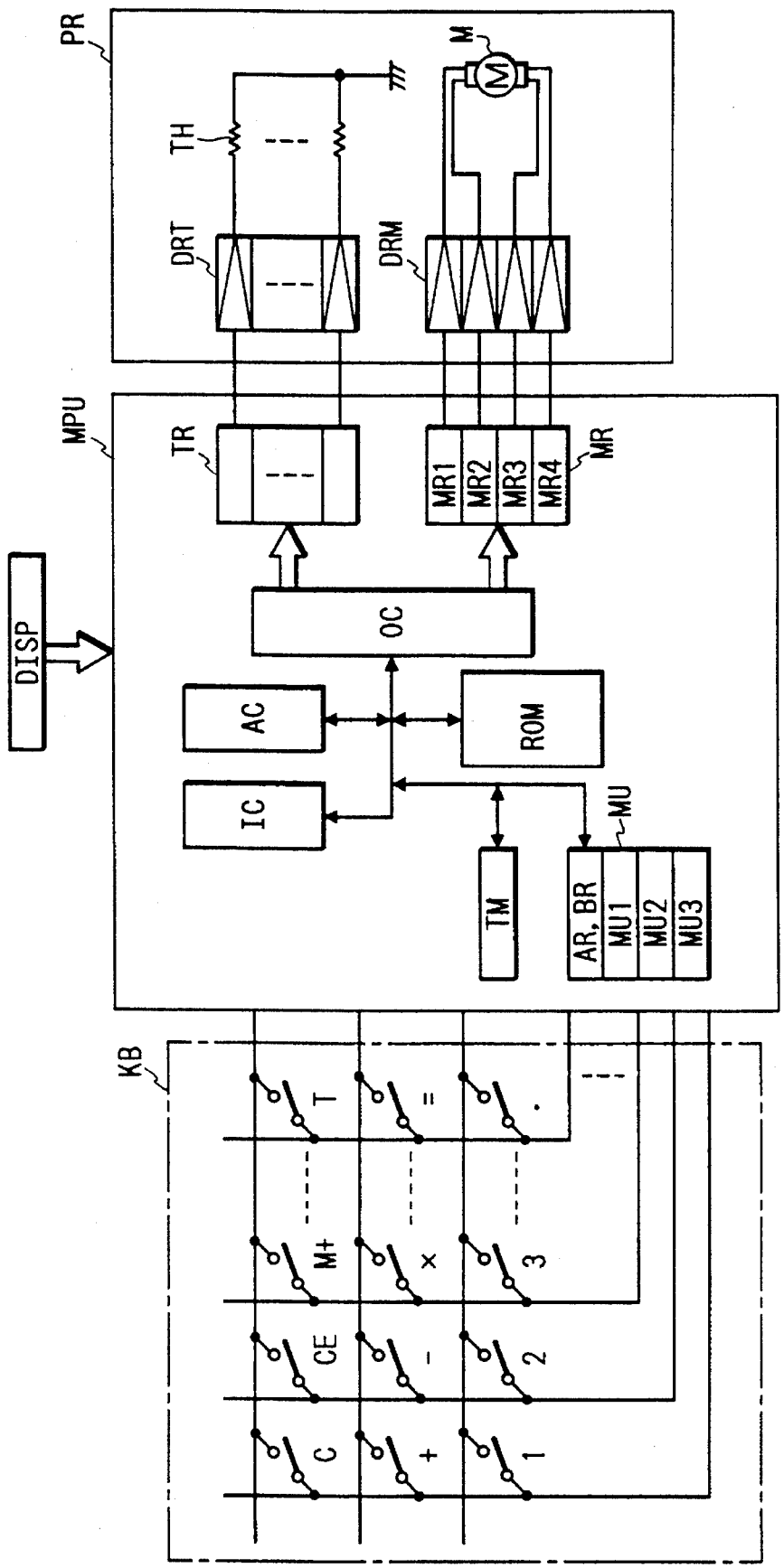
FIG. 1 is a block diagram showing a schematic construction of an electronic desk computer as an embodiment 1 of an electronic apparatus having a printer according to the present invention.
Figure 2:
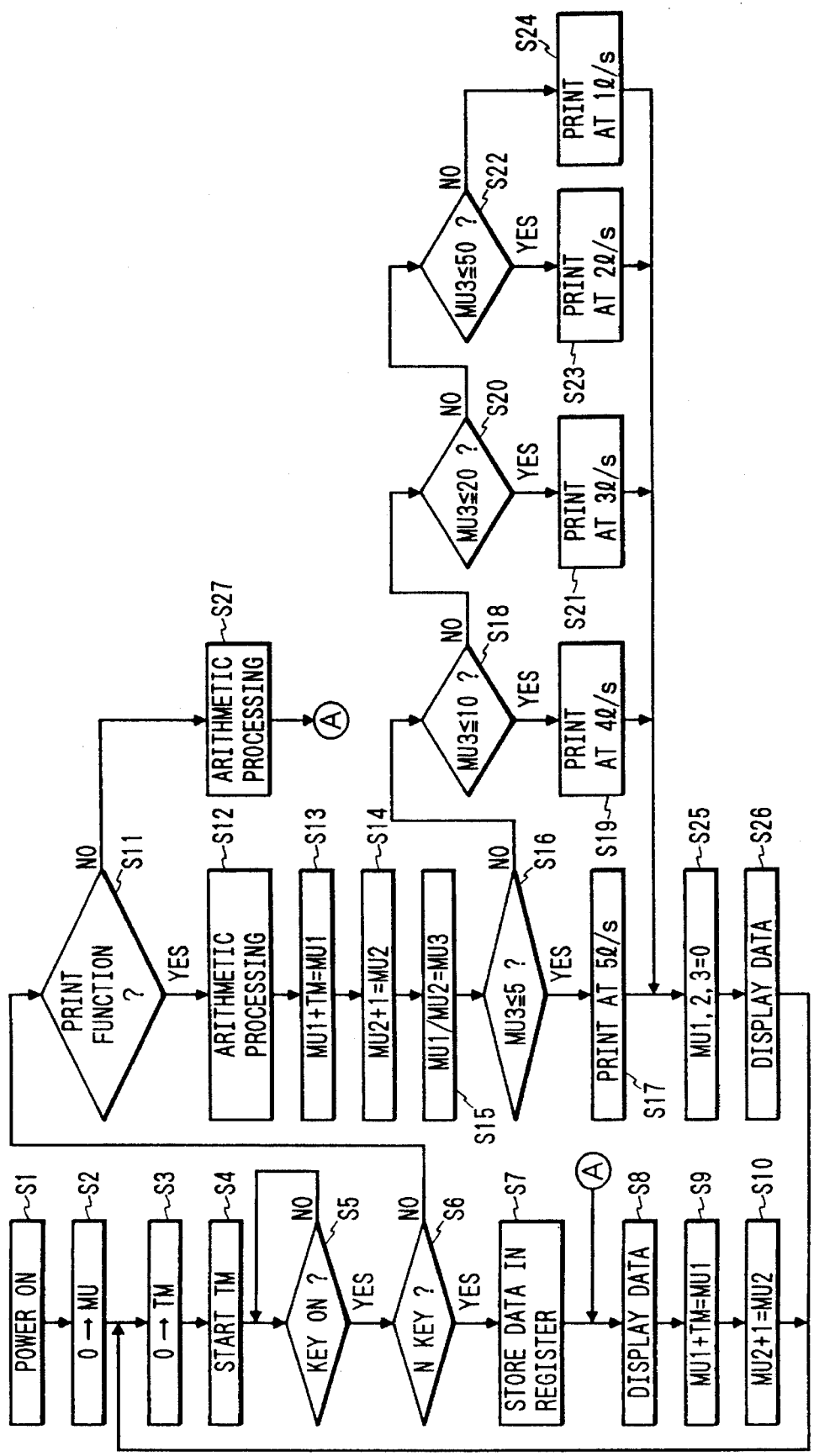
FIG. 2 is a flowchart for explaining the operation of the electronic computer in FIG. 1.

Embodiments of the present invention will be described hereinbelow with reference to the drawings. FIG. 1 is a block diagram showing a schematic construction of an electronic desk computer as an embodiment 1 of an electronic apparatus having a printer according to the invention. FIG. 2 is a flowchart for explaining the operation of the computer of FIG. 1.

In FIG. 1, the electronic desk computer mainly comprises: a keyboard section KB; a central processing unit (microprocessor) MPU; a display unit DISP to display the result of the calculation or the like; and a printer PR which can print the result of the calculation or the like at a variable printing speed. The keyboard section KB has: numeric keys which are used when the user inputs numeric data; four-arithmetical operation keys such as addition "+", subtraction "−", multiplication "×", division "÷" (not shown), and total "=" which are set for printing; and function keys such as clear key "C", memory key "M+", and the like.

The microprocessor MPU mainly comprises: an arithmetic computation unit AC to execute an arithmetic operation corresponding to a key input from the keyboard KB; a read only memory ROM in which a control program of the arithmetic computation unit AC has previously been stored; a memory unit MU which is constructed as a RAM (random access memory) and is used to store input data, result of the calculation, and the like; a timer section TM for measuring the time by generating a pulse, for example, every 10 ms (milliseconds) and by counting the number of pulses; and an input controller IC for generating a key signal to the keyboard section KB and for detecting a key operation signal. The arithmetic computation unit AC controls the input controller IC, timer section TM, and memory unit MU on the basis of the control program which has previously been stored in the fixed memory section ROM and executes the operations according to the numeric key and function key of the keyboard section KB.

The memory unit MU comprises: a register MU1 to store the total time of the operation interval times of the respective keys of the keyboard KB; a register MU2 to store the number of key operation times; a register MU3 to store the value which is obtained by dividing the data of the register MU1 by the value of the register MU2, namely, the average value of the operation time intervals of the keys; and the like.

The timer section TM comprises: a pulse generator to generate a pulse every 10 ms; and a timer register of 16 bits for counting the number of pulses. When the time of about 655 seconds is counted, all of 16 bits of the timer register are set to "1". At this time point, the timer register stops the counting operation and holds the count value as it is in this instance.

The microprocessor MPU also has an output controller OC for supplying the result of the calculation by the arithmetic computation unit AC to the display unit DISP and the printer PR under the control of the arithmetic computation unit AC. As a printer PR, the following various types of printers are well known: a parallel printing type which has print ribbons for, e.g., two colors and performs the printing by driving printing hammers in a lump; a thermal printing type in which a thermal head that is constructed by vertically (in the main scanning direction) arranging heating elements of a few dots in a line is moved to the right and left (in the sub scanning direction) by a motor, thereby printing onto a thermal paper; a serial bubble jet type in which a bubble jet head for emitting an ink droplet by an air bubble that is produced by heating a heating element is moved to the right and left by a motor, thereby printing; and the like.

According to the embodiment 1, as shown in FIG. 1, there is used the printer PR of the thermal printing type such that a thermal head which is constructed by vertically arranging heating elements TH of a few dots in a line is moved to the right and left by a stepping motor M, thereby printing onto a thermal paper. Currents are selectively supplied to some of the heating elements TH in accordance with the print data by a driver circuit DRT, so that the proper heating elements generate heat. The stepping motor M is rotated by the driver circuit DRT, thereby moving the thermal head to the right and left. A printing speed of the printer PR is determined by a moving speed of the stepping motor M. For instance, when the stepping motor M is driven at a frequency of 1 kHz (kilohertz), the printer can print at a speed of 5 l/sec (lines per second). When the motor M is driven at a frequency of 0.8 kHz, the printer can print at a speed of 4 l/sec. Similarly, the printer can print at a speed of 3 l/sec at a frequency of 0.6 kHz; at 2 l/sec at 0.4 kHz; and at 1 l/sec at 0.2 kHz.

The driving frequency of the stepping motor M is controlled by generating a driving frequency from the output controller OC in the microprocessor MPU to the motor register MR for driving the motor. The heating elements TH selectively generate heat by generating a current supplying signal according to the printing speed from the output controller OC in the microprocessor MPU to the thermal register TR.

The operation of the embodiment 1, particularly, the operation of the arithmetic computation unit AC will now be described with reference to FIG. 2.

When the power source is turned on (step S1), the registers MU1 to MU3 of the memory unit MU are first cleared (step S2). The count value of the timer TM is reset (step S3). The timer section TM is started (step S4). An instruction to turn on a key signal is subsequently generated and a check is made to see if a key of the keyboard section KB has been operated or not (step S5). If YES in step S5, step S6 follows and a check is made to see if the operated key is a numeric key (N key) or not. If YES in step S6, the processing routine advances to step S7 and subsequent steps. When a key other than the N key is operated, the processing routine jumps to step S11 and subsequent steps.

When an N key is depressed, a data registration processing (step S7) according to the operation of the N key and a display processing (step S8) are executed. After that, the count value of the timer TM is added to the value in the register MU1 of the memory unit MU (step S9). The value in the register MU2 of the memory unit MU is increased by "1" and the number of key operation times is counted (step S10). The processing routine is now returned to step S3 and the count value of the timer TM is reset.

On the other hand, when a key other than the N key is depressed, a check is made in step S11 to see if a P (print) function key for printing such as addition "+", subtraction "−", total "=", or the like has been operated or not. If YES, the processing routine advances to step S12 and subsequent steps. When a function key which does not perform the printing is operated, step S27 follows and an arithmetic operation processing according to the operated function key is executed and step S8 follows.

Therefore, each time a numeric N key and a function key which does not execute the printing are operated, the number of operation times of such keys is stored into the register MU2.

When the print (P) function key accompanied with the printing operation is depressed, the arithmetic operation processing according to the P function key, namely, the arithmetic operation such as addition "+", subtraction "−", total "=", or the like is executed (step S12). After that, the count value of the timer TM is added to the value in the register MU1 of the memory unit MU (step S13). The value in the register MU2 of the memory unit MU is increased by "1" and the number of key operation times is counted (step S14). Therefore, a period of time which is required after the operation of the P function key until the P function key is subsequently operated is accumulated and stored into the register MU1.

The value which is obtained by dividing the operation interval time (register MU1) of the function key accompanied with the printing operation by the number of operation times of the key (register MU2), namely, the average value of the operation time interval of the key is obtained and stored into the register MU3. When the average value in the register MU3 is equal to or less than 5 (MU3 ≦5), that is, when the average operation time interval of the key is equal to or less than 50 msec (=5×10 msec), the driving frequency of the stepping motor M is set to 1 kHz so that the printer PR can print the result of the calculation at the highest speed of 5 l/sec (steps S16, S17). The user whose average key operation time interval is equal to or less than 50 msec can operate the keyboard KB at a fairly high speed.

When 5<MU3≦10, the printer prints at a speed of 4 l/sec (steps S18, S19). When 10<MU3≦20, the printer prints at a speed of 3 l/sec (steps S20, S21). When 20<MU3≦50, the printer prints at a speed of 2 l/sec (steps S22, S23). When 50<MU3, namely, when the average key operation time interval exceeds 500 msec (=50×10 msec), the driving frequency of the stepping motor M is set to 0.2 kHz so that the printer PR prints the result of the calculation at the lowest speed of 1 l/sec (steps S22, S24). The values in the registers MU1, MU2, and MU3 are cleared (step S25). The result of the calculation in step S12 is displayed on the display unit DISP (step S26). The processing routine is returned to step S3.

According to the embodiment 1, therefore, the period of time (register MU1) which is required after the function key accompanied with the printing operation on the keyboard KB was operated until the function key accompanied with the printing operation is subsequently operated is divided by the number of key operation times (register MU2), thereby obtaining the average value of the key operation time interval. The printing speed of the printer PR is controlled in accordance with the average operation time interval. Thus, the printer PR can print at a speed according to the key operating speed of the user.

Figure 3:
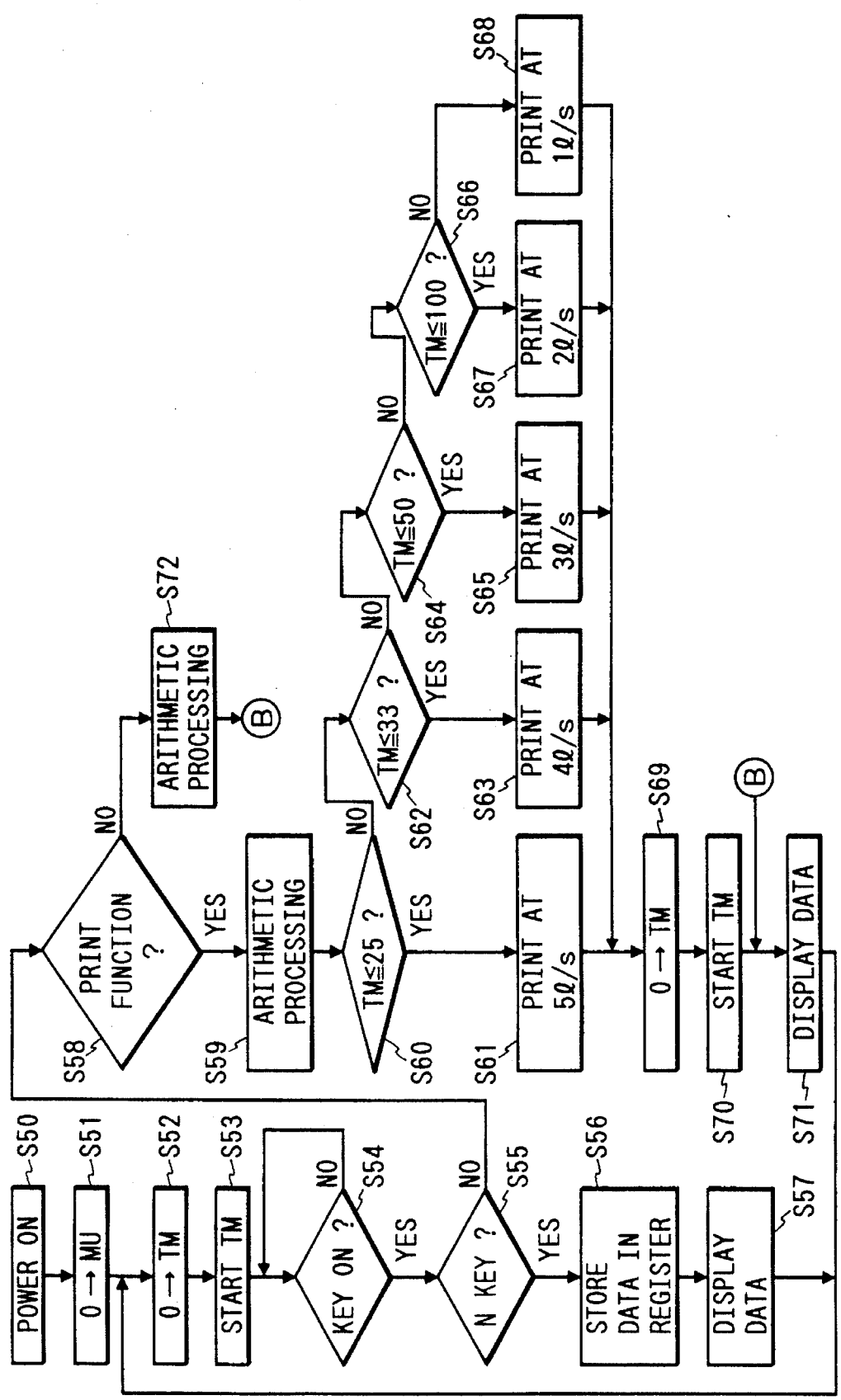
FIG. 3 is a flowchart for explaining the operation of an electronic computer according to an embodiment 2 of the present invention.

An embodiment 2 will now be described. FIG. 3 is a flowchart for explaining the operation of the embodiment 2. In the above embodiment 1, the printing speed of the printer PR has been controlled in accordance with the average key operation time interval. In the embodiment 2, however, the printing speed of the printer PR is controlled in accordance with only the time interval during which the function key to print is operated. When the printing operation is executed, the timer section TM is reset (step S69) and is restarted (step S70).

The operations shown in steps S50 to S57 and S72 in FIG. 3 are substantially the same as the operations shown in steps S1 to S8 and S27 in FIG. 2. When the numeric key is displayed in step S57, 10 the processing routine is returned to step S52. Namely, the operation time interval of each key and the number of key operation times in the embodiment 1 are not obtained in the embodiment 2.

When the function key to print is operated (step S58), the operation processing according to such a function key is executed (step S59). After that, the count value of the timer TM, namely, a period of time which is required after the preceding printing operation was performed until the function key to print is now operated is discriminated. When the count value of the timer TM is equal to or less than 25, that is, when the time interval during which the function key to print is operated is equal to or less than 250 msec (25×10 msec), the driving frequency of the stepping motor M is set to 1 kHz so that the printer PR prints the result of the calculation at the highest speed of 5 l/sec (steps S60, S61).

When 25<TM≦33, the printer prints at a speed of 4 l/sec (steps S62, S63). When 33<TM≦50, the printer prints at a speed of 3 l/sec (steps S64, S65). When 50<TM≦100, the printer prints at a speed of 2 l/sec (steps S66, S67). When 100<TM, namely, when the time interval during which the function key to print is operated exceeds one second (=100× 10 msec), the driving frequency of the stepping motor M is set to 0.2 kHz so that the printer PR prints the result of the calculation at the lowest speed of 1 l/sec (steps S66, S68). The timer TM is reset (step S69) and is restarted (step S70). The results of the calculations in steps S59 and S72 are displayed on the display unit DISP (step S71). The processing routine is returned to step S54.

Therefore, in the embodiment 2 as well, since the printing speed of the printer PR is similarly controlled in accordance with the time interval during which the function key accompanied with the printing operation is operated, the printer PR can print at a speed according to the key operating speed of the user.

Although the embodiment 2 has been described with respect to the example of the case of controlling the printing speed by controlling the driving frequency of the stepping motor M, for instance, in a printer using a DC motor which does not use a governor, the printing speed can be controlled by controlling a driving voltage of the DC motor.

According to the invention as described above, in an electronic apparatus with a printer comprising: the keyboard; the arithmetic computation unit to calculate the data supplied through the keyboard; and the printer which can print the result of the calculation by the arithmetic computation unit, the electronic apparatus further comprises the measuring means for measuring the key operation time interval of the keyboard and the control means for controlling the printing speed of the printer in accordance with the key operation time interval measured by the measuring means, so that the printer can print at a speed according to the key operating speed of the user.

An embodiment 3 of the present invention will now be described hereinbelow with reference to the drawings.

Figure 4:
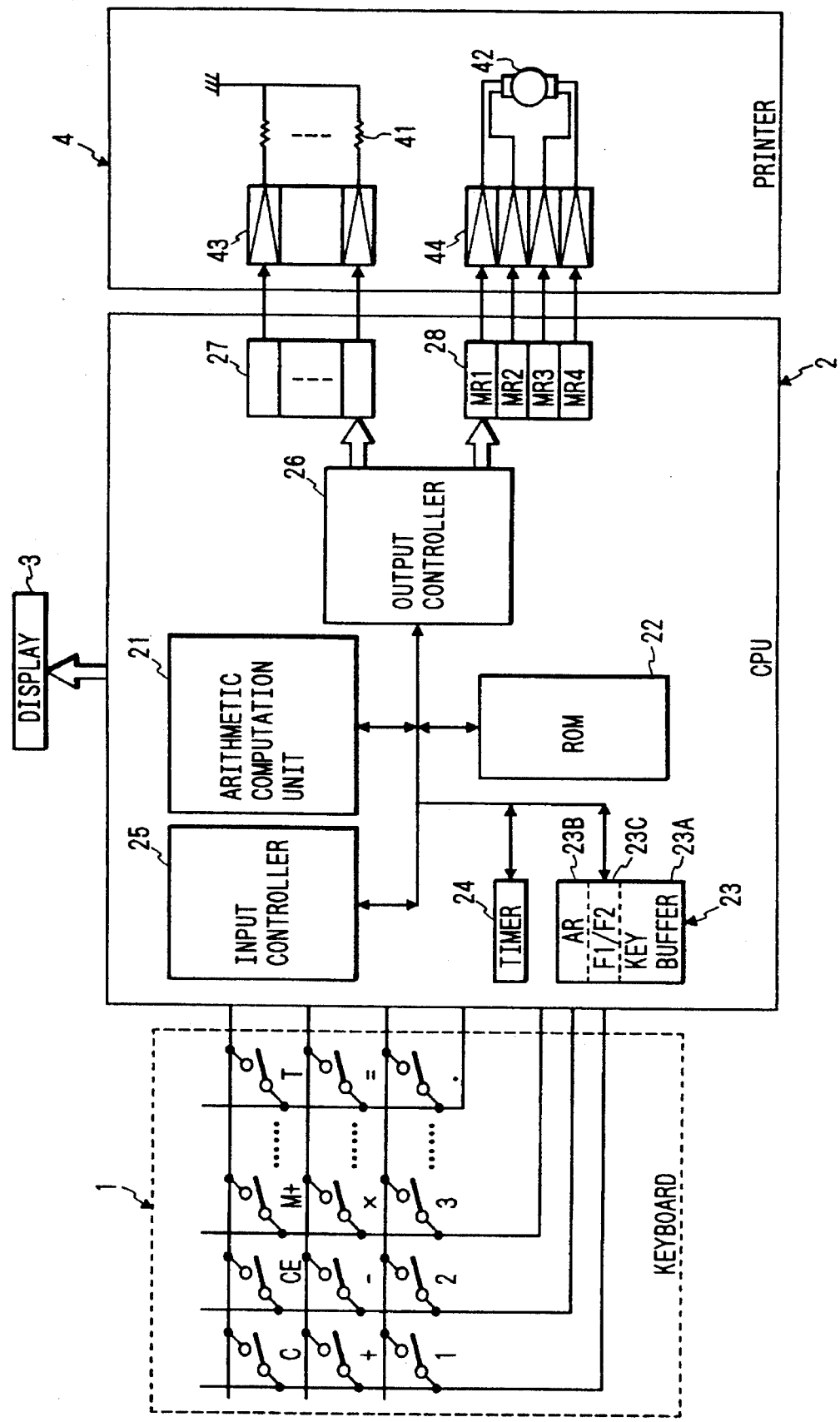
FIG. 4 is a block diagram showing a schematic construction of a control circuit of an electronic apparatus having a printer according to an embodiment 3 of the present invention.

FIG. 4 is a block diagram showing a schematic construction of a control circuit of an electronic apparatus with a printer according to the embodiment 3 of the present invention. The embodiment is applied to an electronic computer.

As shown in FIG. 4, the electronic computer comprises: a keyboard section 1; a central processing unit (microprocessor) 2; a display 3 to display the result of the calculation or the like; and a printer 4 which can print the result of the calculation or the like at a variable printing speed.

The keyboard section 1 comprises: numeric keys which are used when the user inputs numeric data; four-arithmetical operation keys such as addition "÷", subtraction "−", multiplication "×", division "+" (not shown), and sign of equality "=" which are set so as to print; and function keys such as clear key "C", memory key "M+", and the like.

The microprocessor MPU 2 mainly comprises: an arithmetic computation unit 21 to execute a calculation according to the key input from the keyboard section 1; a fixed memory section (ROM) 22 in which a control program which is executed by the arithmetic computation unit 21 has previously been stored; a memory unit 23 comprising an RAM for storing the input data, result of the calculation, and the like; a timer 24 for generating a pulse, for instance, every 5 msec and for allowing the arithmetic computation unit 21 to execute an interruption processing; and an input controller 25 for generating a key signal to the keyboard section 1 and for detecting a key operation signal. The arithmetic computation unit 21 controls the input controller 25, timer 24, and memory unit 23 on the basis of the control program which has previously been stored in the ROM 22 and executes the arithmetic operation in accordance with the operations of numeric keys, function key, and the like of the keyboard section 1.

The memory unit 23 comprises: a key buffer memory 23A to sequentially store key code information corresponding to the input keys operated from the keyboard section 1 in accordance with the order of the key operations; an AR/BR memory 23B to store the input numeric value data and calculation data; and $F_1/F_2$ memory 23C to store a flag ($F_1/F_2$) which is necessary for control; and the like.

The microprocessor MPU 2 further has an output controller 26 to generate the result of the calculation by the arithmetic computation unit 21 to the display 3 and the printer 4 under the control of the arithmetic computation unit 21.

As a printer, the following various types of printers are well known: a parallel printing type which has print ribbons for, e.g., two colors and performs the printing by driving printing hammers in a lump; a thermal printing type in which a thermal head that is constructed by vertically arranging heating elements of a few dots in a line is moved to the right and left by driving a motor, thereby printing onto a thermal paper; a serial bubble jet type in which a bubble jet head for emitting an ink droplet by an air bubble that is produced by heating a heating element is moved to the right and left by a motor, thereby printing; and the like.

According to the embodiment 3, as shown in FIG. 4, there is used the printer 4 of the thermal printing type such that a thermal head which is constructed by vertically arranging heating elements 41 of a few dots in a line is moved to the right and left by a stepping motor 42, thereby printing onto a thermal paper. In the printer 4, a driver 43 is connected to the output controller 26 through a thermal register 27. A driver 44 is connected to the output controller 26 through a motor register 28.

Currents are selectively supplied to the heating elements 41 of the printer 4 by the driver 43 in accordance with the print data, so that the heating elements generate heat. The stepping motor 42 is rotated by the driver 44, thereby moving the thermal head to the right and left. The printing speed of the printer 4 is determined by the driving speed of the stepping motor 42. For instance, when the stepping motor 42 is driven at a frequency of 1 kHz, the printer 4 can print at a speed of 5 l/sec. When the stepping motor is driven at a frequency of 0.8 kHz, the printer can print at a speed of 4 l/sec. Similarly, the printer can print at a speed of 3 l/sec at a frequency of 0.6 kHz; at a speed of 2 l/sec at a frequency of 0.4 kHz; and at a speed of 1 l/sec at a frequency of 0.2 kHz.

The stepping motor 42 is controlled by generating a driving signal from the output controller 26 to the motor register 28 for driving the motor on the basis of a control instruction of the microprocessor 2.

The heating elements 41 selectively generate the heat by supplying a current supplying signal according to the printing speed from the output controller 26 to the thermal register 27 on the basis of the control instruction of the microprocessor MPU 2.

The operation of the embodiment 3, particularly, the operation of the arithmetic computation unit 21 will now be described with reference to FIGS. 5 and 6.

Figure 5:
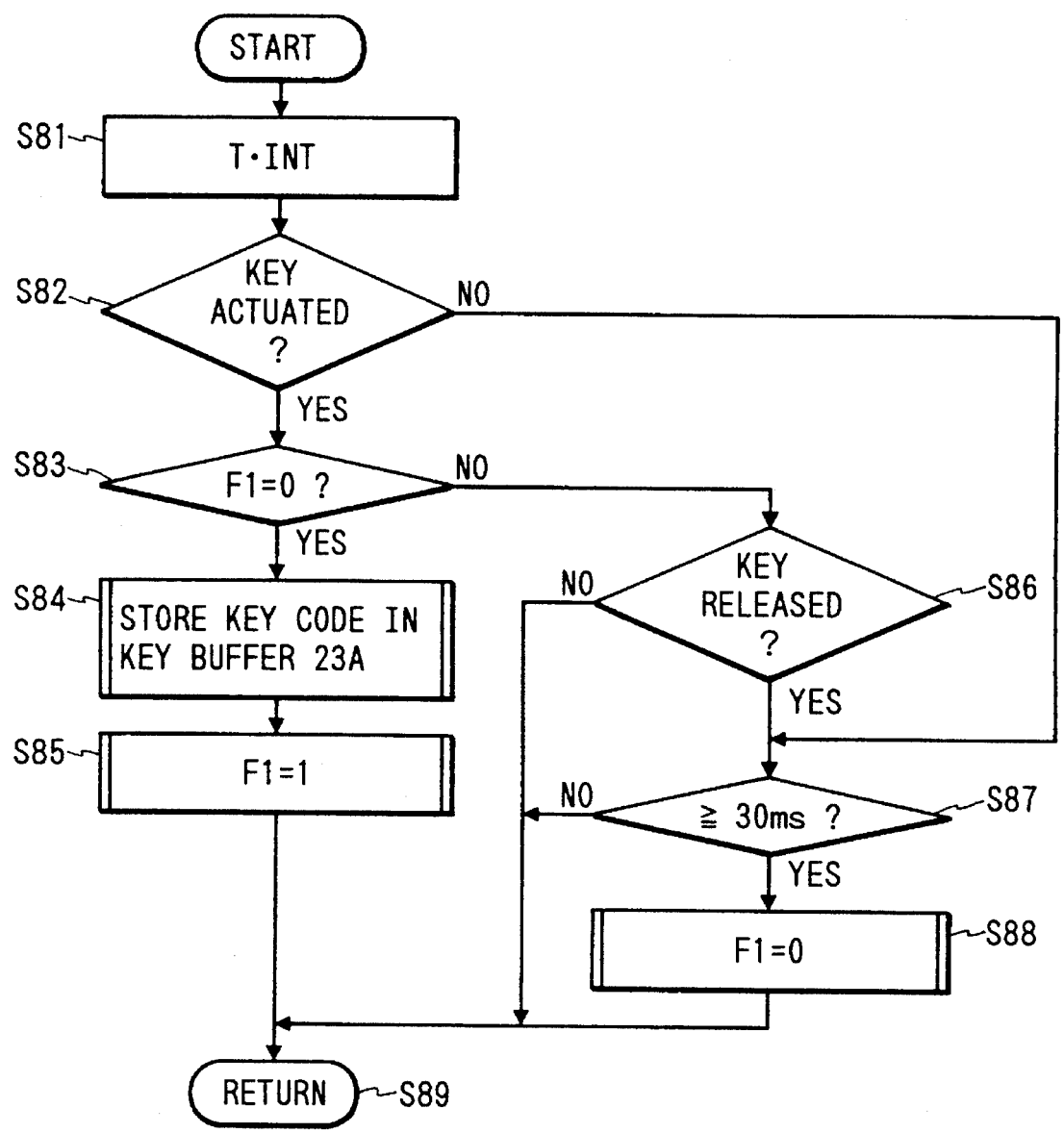
FIG. 5 is a flowchart showing a control procedure for an interruption processing in FIG. 4.

FIG. 5 is a flowchart showing a control procedure for an interruption processing. The interruption control is executed by a signal of every 5 msec which is periodically generated from the timer 24.

First, when an interruption signal is generated, the processing routine jumps to a timer interrupting (T.INT) routine in step S81. In the next step S82, a check is made to see if a key is operated or not. The discrimination in step S82 is performed by supplying a key scanning signal from the input controller 25 to the keyboard 1 and by receiving the key signal from the keyboard 1. When the key is operated, step S83 follows and a check is made to see if the flag $F_1$ is equal to "0" or not. When the flag $F_1$ is equal to "0", this means that the key operation is the first operation and the key information take-in processing is executed. Namely, a key code corresponding to the depressed key is stored into the key buffer memory 23A in the memory unit 23 in step S84. Subsequently, a key information take-in processing is completed and the flag $F_1$ is set into "1" (step S85). A return processing is executed (step S89) and the interruption processing is finished.

When the key is operated in step S82 and the flag $F_1$ has been set to "1" in step S83, step S86 follows and a check is made to see if the key is continuously depressed or not. If YES, the return processing is performed in step S89 and the processing routine is finished.

However, if the key is not continuously depressed (OFF state) in step S86, a check is made in step S87 to see if the OFF state has continued for 30 msec or more or not. If YES, the flag $F_1$ is reset to "0" in the next step S88, thereby enabling the next key operation information to be taken in. Step S89 is subsequently executed and the processing routine is finished.

When the OFF state does not continue for 30 msec or more in step S87, the processing routine is finished without resetting the flag $F_1$ to "0".

When the key is not depressed in step S82, a check is made in step S87 to see if the OFF state has continued for 30 msec or more or not. If YES, the flag $F_1$ is reset to "0" (step S88). If NO, the processing routine is finished. As mentioned above, the key code information corresponding to the keys operated are sequentially stored into the key buffer memory 23A.

The key buffer memory 23A to store the key code information ordinarily has a memory capacity enough to store the key code information corresponding to twenty keys.

A printing speed control procedure of the embodiment 3 will now be described with reference to FIG. 6.

Figure 6:
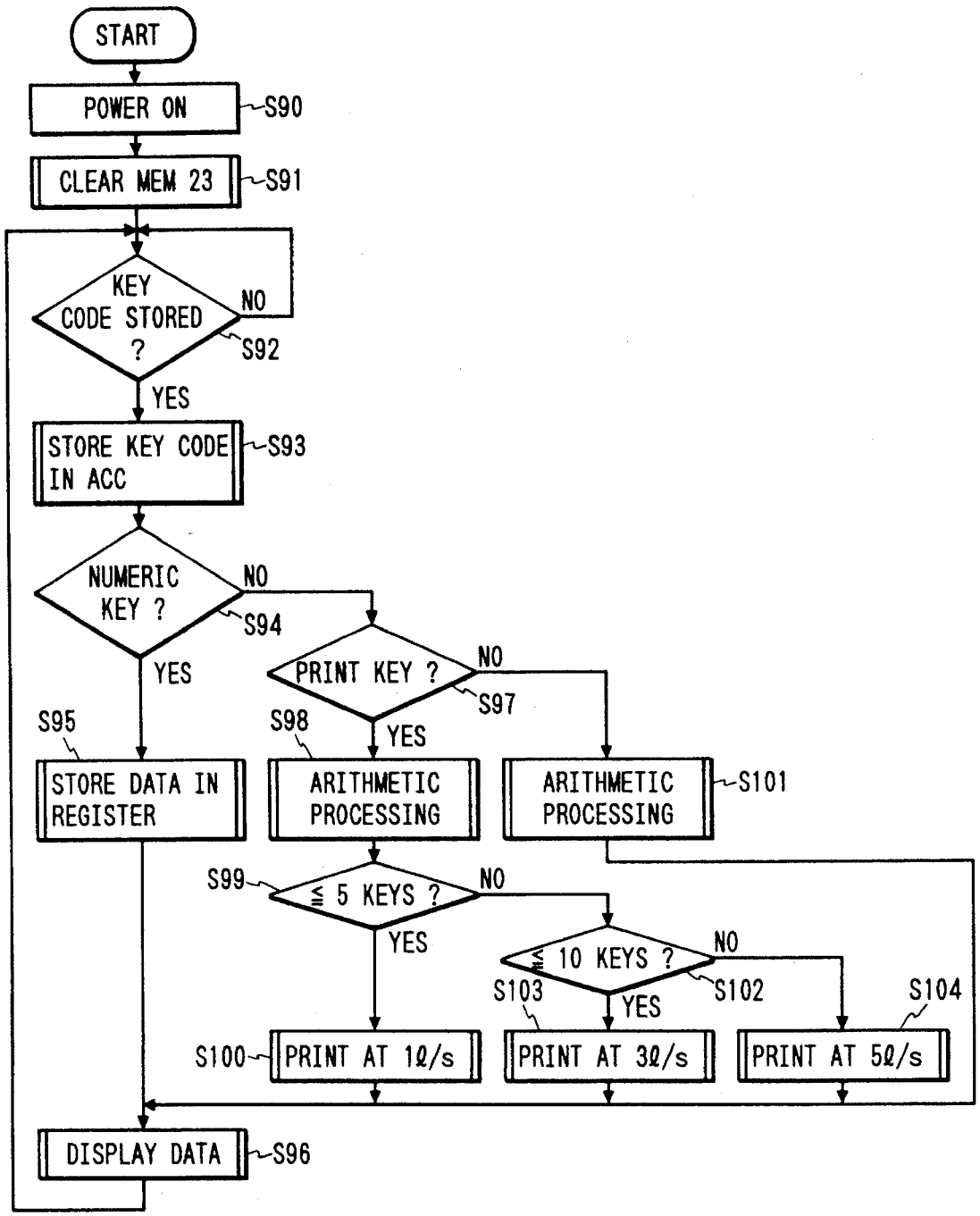
FIG. 6 is a flowchart showing a printing speed control procedure of the electronic computer according to the embodiment of FIG. 4.

FIG. 6 is a flowchart showing a printing speed control procedure for the electronic computer according to the embodiment 3.

First, when the power supply is turned on (step S90), the memory content in the memory unit 23 is cleared to "0" (step S91). A check is made in step S92 to see if a key code has been stored in the key buffer memory 23A or not. If NO, the above processings are repeated until a key code is stored into the key buffer memory 23A. During the above time interval as well, the foregoing interruption processing in FIG. 5 is executed by the interruption signal of every 5 msec from the timer 24. When the key is operated, the key code information of the operated key is stored into the key buffer memory 23A in step S84 in FIG. 5. When the key code information is stored as mentioned above, step S93 follows and the key code which has been first stored (the oldest key code in the key buffer memory 23A) is read out from the key code information stored in the key buffer memory 23A and stored into an accumulator (ACC) (not shown) in the arithmetic computation unit 21. A check is subsequently made to see if the key code read out by the arithmetic computation unit 21 indicates a numeric key or not (step S94). If YES, a data registration processing (step S95) is executed. After that, the numeric data is displayed on the display 3 (step S96). The processing routine is again returned to step S92.

When the numeric key is continuously operated, the key code information is sequentially stored into the key buffer memory 23A by the interruption processing in FIG. 5. The data registration processing (step S95) is executed.

When the key code does not indicate the numeric key in step S94, a check is made in step S97 to see if the key code indicates a P key or not. Namely, a check is made to see if the key code in the ACC indicates the key accompanied with the printing operation or not. If NO in step S97, step S101 follows and the arithmetic operation processing corresponding to the depressed key is executed. After that, the result of the calculation is displayed in step S96 and the processing routine is returned to step S92. If YES in step S97, step S98 follows and the arithmetic operation processing corresponding to each key is executed. A check is now made in step S99 to see if the number of key codes stored in the key buffer memory 23A is equal to or less than five keys or not. If YES in step S99, step S100 follows and the stepping motor 42 is driven at a frequency of 0.2 kHz and the printer prints at a printing speed of 1 l/sec. The print data is displayed in step S96. After that, the processing routine is returned to step S92.

When the number of key codes in the key buffer memory 23A is larger than five keys in step S99, a check is further made in step S102 to see if it is equal to or less than ten keys or not. If YES, step S103 follows and the stepping motor 42 is driven at a frequency of 0.6 kHz, thereby printing at a printing speed of 3 l/sec.

When the key codes of the number larger than ten keys are stored in step S102, step S104 follows and the stepping motor 42 is driven at a frequency of 1 kHz and the printer prints at the highest printing speed of 5 l/sec. After completion of the print processing, the print data is displayed in step S96. The processing routine is again returned to step S92.

Therefore, according to the embodiment 3, the printer can print at different printing speeds in accordance with the number of key codes stored in the key buffer memory 23A.

An embodiment 4 of the present invention will now be described with reference to FIG. 7.

Figure 7:
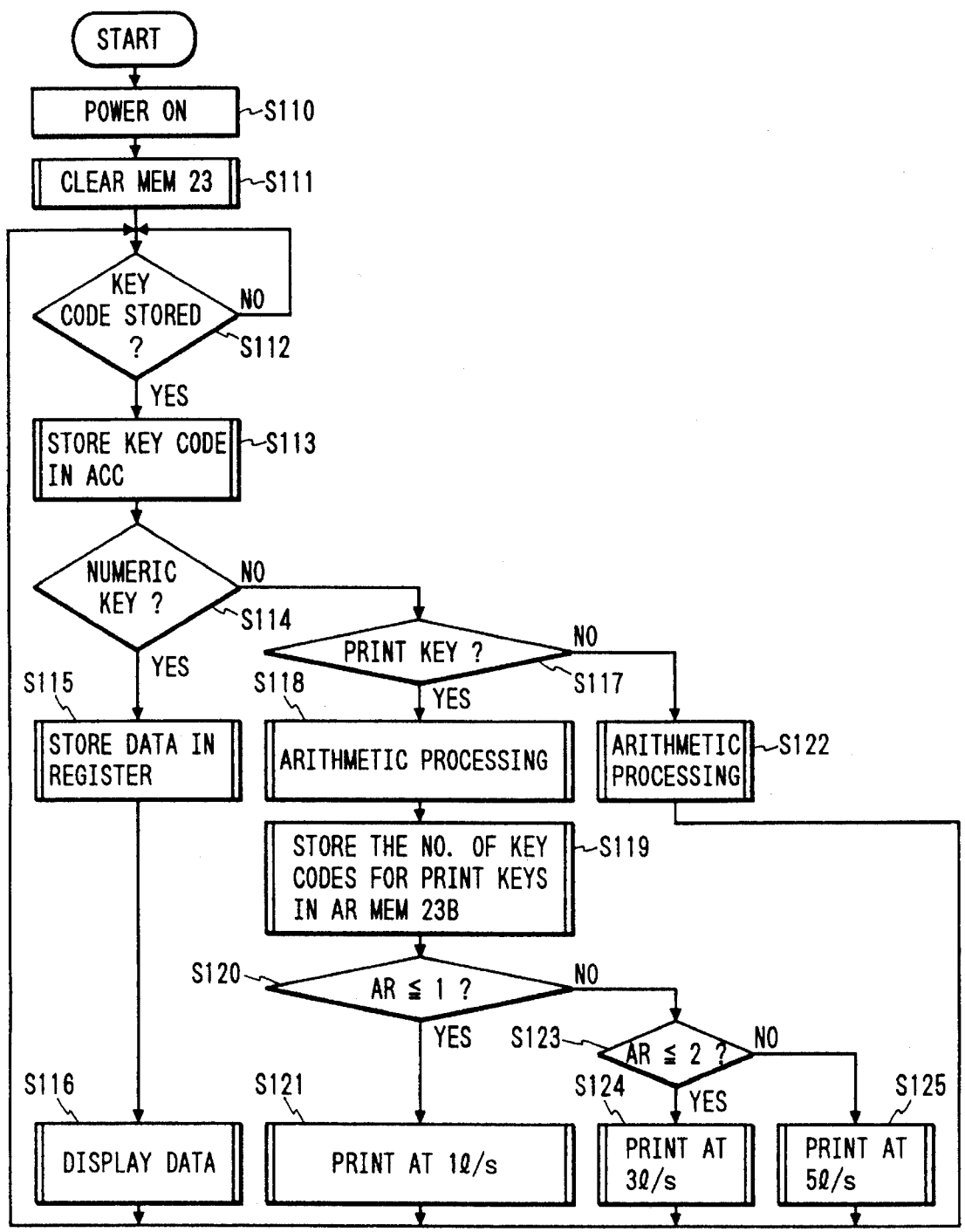
FIG. 7 is a flowchart showing a printing speed control procedure of an electronic computer according to an embodiment 4 of the present invention.

FIG. 7 is a flowchart showing a control procedure of a printing speed of an electronic computer according to the embodiment 4.

Although the embodiment 3 of FIG. 6 has been described above with respect to the example of the case of making the printing speed variable merely in accordance with the number of key codes stored in the key buffer memory 23A, since the numeric key is processed at a high speed, the print control is executed in dependence on the number of key codes of only the keys accompanied with the printing operation which have been stored in the key buffer memory 23A in the embodiment 4.

In FIG. 7, the operations in steps S110 to S118 are substantially the same as those in steps S90 to S98 in FIG. 6 and their descriptions are omitted here.

After the arithmetic operation processing corresponding to the depressed key was executed in step S118, the number of key codes accompanied with the printing operation in the key buffer memory 23A is detected in step S119 and the number of such key codes is stored into the AR memory 23B in the memory unit 23. In the next step S120, a check is made to see if the number of key codes in the AR memory 23B is equal to or less than one key or not. If YES in step S120, namely, when the number of key codes accompanied with the printing operation which are included in the key codes stored in the key buffer memory 23A is equal to or less than one key, the printer prints at a printing speed of 1 l/sec (step S121). When it is larger than one key, step S123 follows and a check is made to see if the number of key codes is equal to or less than two keys or not. If YES, the printer prints at a printing speed of 3 l/sec (step S124). When it is larger than two keys, the printer prints at a printing speed of 5 l/sec (step S125).

Therefore, according to the embodiment 4, the printer can print at different printing speeds in accordance with the number of key codes of the keys accompanied with the printing operation which have been stored in the key buffer memory 23A.

As described above, according to the electronic apparatus with the printer of the invention, since the printing speed of the printer is variably controlled in accordance with an information amount of the key codes stored in the key input buffer, the printer can print at a printing speed according to the key operating speed of the user. There are advantages such that the printing noise can be reduced, the electric power consumption can be saved, and the operating efficiency can be improved.

What is claimed is:

1. An electronic apparatus comprising:

a keyboard;

data processing means for processing data supplied through said keyboard;

memory means for storing the data processed by said data processing means;

measuring means for measuring a key operation time of said keyboard for the data stored in said memory means; and control means for determining a print speed for the data stored in said memory means in accordance with a measurement performed by said measuring means and controlling a printer to print the stored data at the determined printing speed.

2. An apparatus according to claim 1, wherein said keyboard has a first key group comprised of first keys which are set so that the printer prints when a key of said first key group is operated and a second key group comprised of second keys which are set so that the printer does not print when the key of said second key group is operated, wherein said control means controls the printing speed of the printer in accordance with operation time of said first key group.

3. An electronic apparatus comprising:

a keyboard including a group of keys for printing;

data processing means for processing data supplied through said keyboard;

a printer to print the data processed by said data processing means;

key input buffer means for temporarily storing key code information, corresponding to each of the keys, supplied from said keyboard;

detecting means for detecting an amount of the key code information stored in said key input buffer means;

measuring means for measuring an input interval of the key code information stored in said key input buffer means in accordance with a detection executed by said detecting means; and control means for controlling a printing speed of said printer in accordance with the input interval measured by said measuring means.

4. An apparatus according to claim 3, wherein said control means controls the printing speed of said printer in accordance with the key code information amount of the group of keys which are set so as to print in the key code information stored in the key input buffer means.

5. An electronic apparatus having a printer, said apparatus comprising:

key input means;

processing means for executing a processing of data supplied through said key input means;

memory means for storing the data processed by said processing means;

means for measuring time interval information of a key operation by said key input means for the data stored in said memory means; and control means for generating a predetermined control signal in accordance with the time interval information measured by said measuring means, wherein the data processed by said processing means is printed at a variable printing speed on the basis of the control signal generated by said control means.

* * * * *

UNITED STATES PATENT AND TRADEMARK OFFICE
CERTIFICATE OF CORRECTION

PATENT NO.  : 5,454,065
DATED       : September 26, 1995
INVENTOR(S) : Shigeru Toyomura It is certified that error appears in the above-indentified patent and that said Letters Patent is hereby corrected as shown below:

<u>Column 1</u>

Line 25, change "fields" to --field--; and
    Line 67, delete "20".

<u>Column 5</u>

Line 28, delete "10".

<u>Column 6</u>

Line 28, change "addition "÷"," to --addition "+",--;
       and
    Line 29, change "division "+"" to --division "÷"--.

Signed and Sealed this

Twelfth Day of December, 1995

Attest:

BRUCE LEHMAN

*Attesting Officer*      *Commissioner of Patents and Trademarks*